United States Patent
Pich et al.

(10) Patent No.: US 8,383,560 B2
(45) Date of Patent: Feb. 26, 2013

(54) METHOD OF CONTINUOUS DISSOLUTION OF POLYACRYLAMIDE EMULSIONS FOR ENHANCED OIL RECOVERY (EOR)

(75) Inventors: Rene Pich, Saint-Etienne (FR); Philippe Jeronimo, Montrond les Bains (FR)

(73) Assignee: S.P.C.M. SA, Andrezieux Boutheon (FR)

( * ) Notice: Subject to any disclaimer, the term of this patent is extended or adjusted under 35 U.S.C. 154(b) by 232 days.

(21) Appl. No.: 12/840,249

(22) Filed: Jul. 20, 2010

(65) Prior Publication Data

US 2011/0118153 A1    May 19, 2011

Related U.S. Application Data

(60) Provisional application No. 61/272,256, filed on Sep. 4, 2009.

(30) Foreign Application Priority Data

Aug. 7, 2009  (FR) ...................... 09 55555

(51) Int. Cl.
- C09K 8/588 (2006.01)
- C09K 8/528 (2006.01)
- E21B 19/00 (2006.01)

(52) U.S. Cl. ........ 507/225; 507/221; 507/224; 166/90.1
(58) Field of Classification Search .................. 507/225, 507/221, 224; 166/90.1
See application file for complete search history.

(56) References Cited

U.S. PATENT DOCUMENTS

| | | | |
|---|---|---|---|
| 3,234,163 A | 2/1966 | Schurz et al. | |
| 3,235,523 A | 2/1966 | Schurz et al. | |
| 3,284,393 A | 11/1966 | Vanderhoff et al. | |
| 3,343,601 A | 9/1967 | Pye et al. | |
| 3,624,019 A | 11/1971 | Anderson et al. | |
| 3,734,873 A * | 5/1973 | Anderson et al. | ............... 23/336 |
| 4,141,842 A | 2/1979 | Abdo | |
| 4,317,759 A | 3/1982 | Kanda et al. | |
| 4,481,316 A | 11/1984 | Kanda et al. | |
| 4,622,356 A | 11/1986 | Jarovitzky et al. | |
| 4,795,575 A | 1/1989 | Southwick et al. | |

(Continued)

FOREIGN PATENT DOCUMENTS

| | | |
|---|---|---|
| EP | 0100963 A2 | 2/1984 |
| EP | 1 437 173 A1 | 7/2004 |

(Continued)

OTHER PUBLICATIONS

International Search Report for PCT/EP2009/057270, mailed Nov. 5, 2009.
Bayer et al., Don't be baffled by Static Mixers. Chemical Engineering. May 2003:50-7. Available at http://www.highbeam.com/doc/1G1-102272308.html/print. Last accessed Nov. 22, 2011. 4 pages.

(Continued)

*Primary Examiner* — John J Figueroa
*Assistant Examiner* — Atnaf Admasu
(74) *Attorney, Agent, or Firm* — Wolf, Greenfield & Sacks, P.C.

(57) ABSTRACT

Enhanced oil recovery method consisting in continuously dissolving, in the injection water, a stable invert emulsion of acrylamide (co)polymer containing at least one inverting agent, and a water soluble polymer, whereby:
- in a first step, the emulsion is prediluted in a first static mixer to a (co)polymer concentration of at least 5 g/l, the difference of pressure between the mixer outlet and inlet being at least 2 bar,
- in a second step, the suspension from the first mixer is diluted in a second static mixer to a concentration corresponding to the injection concentration of the water in the well of between 500 and 3000 ppm, the difference of pressure between the mixer outlet and inlet being at least 1 bar.

9 Claims, 2 Drawing Sheets

U.S. PATENT DOCUMENTS

| | | | |
|---|---|---|---|
| 4,874,588 A | 10/1989 | Sortwell et al. |
| 4,925,578 A | 5/1990 | Southwick et al. |
| 5,222,807 A | 6/1993 | Gaddis |
| 5,296,577 A | 3/1994 | Tamura et al. |

FOREIGN PATENT DOCUMENTS

| | | | |
|---|---|---|---|
| FR | 2604444 A1 | 4/1988 |
| JP | 57-159839 A | 10/1982 |

OTHER PUBLICATIONS

Kraume et al., Continuous mixing of fluids. Ullmann's Encyclopedia of Industrial Chemistry. 2012;10:105-34.

Thomas, Enhanced Oil Recovery—An Overview. Oil & Gas Science and Technology—Rev IFP. 2008;63(1):9-19.

* cited by examiner

METHOD OF CONTINUOUS DISSOLUTION OF POLYACRYLAMIDE EMULSIONS FOR ENHANCED OIL RECOVERY (EOR)

Polyacrylamides are produced industrially in various forms: powders, water-in-oil emulsions, polymerized beads in suspension, water-in-water emulsions, aqueous solutions, water-alcohol suspensions, etc.

These polymers may have similar physicochemical properties and are usually selected on two criteria:
Cost and, in this case, powders are selected,
Their ease of handling and, despite higher costs, emulsions are selected.

These emulsions were discovered in 1957 by J. W. Vanderhoff and R. M. Wiley (U.S. Pat. No. 3,284,393).

These early emulsions contained microparticles of polymers emulsified in an oil by means of one or more surface active agents having a low HLB (hydrophilic-hydrophobic balance) of about 2 to 6. For these emulsions having such composition, it was very difficult to dilute the polymer microgels directly in a solution. Indeed, the dissolution water have difficulties to penetrate the surface active agents barriers.

They were therefore usually dried by spray drying to yield a powder which dissolved more or less satisfactorily.

In 1970, D. R. Anderson and A. J. Frisque (U.S. Pat. No. 3,624,019) discovered that it was possible to invert these emulsions, by adding a hydrophilic surface active agent (HLB>8). This rather hydrophilic surface active agent enabled the water to penetrate into the polymer spherical microparticule and to dissolve it in a few minutes.

Initially, this surface active agent was delivered and added separately to the dilution water.

But very quickly, the production companies developed formulations in which it was possible to incorporate inverting surface active agents in the emulsion itself, without latter coagulating or being destabilized.

This operation was a real technical challenge because required quantity of hydrophilic surface active agent added was limited by coagulation or destabilization either during production or in storage.

The industrial implementation of this method was the subject of considerable successive researches and numerous patents.

However, even today, limitation to properly invert an emulsion exist, with two main factors:
The quantity of hydrophilic surface active agent the system can sustain to avoid coagulation of the emulsion during production or in storage,
The concentration of polymer reached when dissolving the emulsion in water.

It is commonly found that the maximum quantity of hydrophilic surface active agent, all systems combined, compatible with the stability of the emulsion, is about 5% of the emulsion.

This quantity is the one observed with the most effective NPD (ethoxylated nonylphenol 9 EO) surface active agents or ethoxylated alcohols containing 7-9 EO. Larger quantities of less effective surface active agents can be added, but without improving the dissolution.

With such a concentration of reversing surface active agents, it is found that the emulsion cannot dissolve completely in the water in less than 5 minutes, in an emulsion concentration lower than 9-12 grams/liter or on standard commercial emulsions, about 4-5 grams/liter (4 to 5000 ppm) of active polymer.

Particular Case of Enhanced Oil Recovery

Due to the product costs, EOR mainly uses powders to viscosify the water injected into the oil wells. These polyacrylamide powders are dissolved to a final concentration of 500 to 2000 ppm for injection into the oil well at the field pressure.

In certain cases, and particularly when the product is used on boats (FPSO) or offshore platforms, the handling of very large quantities of powder between a service boat and the FPSO or the platform raises severe limitations associated with air lift transport, difficult to solve today.

In these situations, the end-users prefer to use an emulsion that is easier to transfer by standard offshore pumping means.

The requirements of the end-users are very strict: total dissolution in less than 5 minutes, completely and continuously.

It is therefore necessary to dissolve the emulsion to a final concentration of 500 to 2000 ppm in a pipe in line, which cannot be obtained with a stable emulsion incorporated with a inverting surface active agent in concentrations ensuring the stability thereof.

The test accordingly used consists in measuring the time taken by given volumes of solution containing 1000 ppm of active polymer to flow through a filter. The solution is contained in a cell pressurized to 2 bars and the filter has a diameter of 47 mm and a pore size of 5 microns.

The times required to obtain 100 ml (t100 ml); 200 ml (t200 ml) and 300 ml (t300 ml) of filtrate are therefore measured and a filtration quotient (or filter ratio denoted "FR") is defined, expressed by:

$$FR = \frac{t300 \text{ ml} - t200 \text{ ml}}{t200 \text{ ml} - t100 \text{ ml}}$$

The time measurement accuracy is 0.1 second.

The FR thus represents the capacity of the polymer solution to plug the filter for two equivalent consecutive volumes. A typical acceptability criterion of the industry is FR<1.5.

It is clear that this level of filterability cannot be reached even after several hours of stirring in the laboratory, and even less in industrial conditions for the desired concentrations of 500 and 2000 ppm.

The usual solution is to further incorporate a NP9 type (nonylphenol 9 EO) surface active agent or ethoxylated or alkoxylated alcohol or dioctylsulphosuccinate or other anionic surface active agent in a proportion far above 5% in the dilution water. In these conditions, the emulsion may pass the filterability test.

This solution is difficult to accept by the user because:
Two different chemicals must be handled and stored in difficult conditions, adding a non-negligible investment cost,
The cost of the surface active agent possibly jeopardises the profitability of the project.

To sum up, willing to implement the use invert emulsions today, a person skilled in the art has therefore the choice between:
the further addition of inverting surface active agent with the abovementioned drawbacks;
large scale continuous or batch installations allowing long residence time, implying high costs in investment, volume and maintenance.

The invention refers to a method for dissolving, in line and continuously, a reverse emulsion of acrylamide (co)polymer to the active polymer injection concentration of 500 to 2000 ppm, in order to obtain the filterability lower than 1.5 in less than 5 minutes of mixing contact time.

For this purpose, the applicant has developed a 2-phases in line dissolution:
- A in line dispersion phase at high concentration,
- A subsequent in line dilution phase at the final desired concentration.

More precisely, the invention relates to an enhanced oil recovery method consisting in continuously dissolving a stable invert emulsion of acrylamide (co)polymer containing at least one inverting agent, whereby:
- in a first step, the emulsion is prediluted in a first static mixer mounted on a bypass of the main injection water circuit, to a (co)polymer concentration of at least 5 g/l, preferably between 5 and 20 g/l, advantageously about 20 g/l, the difference of pressure between the mixer outlet and inlet being at least 2 bars, advantageously between 2 and 10 bars, preferably 10 bars,
- in a second step, the dispersion mixture from the first mixer is diluted in a second static mixer mounted on the main injection water circuit, to a concentration corresponding to the injection concentration of the water in the well of between 500 and 3000 ppm, in practice between 1000 and 2000 ppm, the difference of pressure between the mixer outlet and inlet being at least 1 bar, advantageously between 1 and 3 bars, preferably 3 bars.

In the context of the present invention, the stability of these invert emulsions prevent or strongly minimize the following mechanisms and drawbacks:
- slow coagulation of the polymer, resulting in a high increase in viscosity, ultimately leading to gelification;
- "hardening" or "raincycle" (evaporation, condensation) phenomena, due to the storage conditions and leading to viscous masses on the surface and in the bulk;
- formation of lumps, skin, crust, or "waxing" due to the sensitivity of the reverse emulsion to the shear experiencing during the pumping, filtration and stirring steps inherent in the use of these emulsions; leading to the breakage of the mechanical seals of the pumps or the plugging of the filters, valves and check valves;
- and finally, in certain cases, settling, i.e. separation of the two phases of the emulsion.

A person skilled in the art knows how to appropriately dose the quantity of inverting surface active agent in order to avoid experiencing all the abovementioned stability problems within the standard storage period of 6 months. He also knows that an overdosing of inverting surface active agent accelerates these mechanisms.

The upper pressure limits, although not critical, may in practice be limited to avoid the mechanical degradation of the molecular weight of the polymers injected when shear is too high.

According to the invention, the injection water flow rate in the main circuit is typically between 100 and 200 $m^3$/h and the injection pressure is between 40 and 200 bars governed by the field pressure.

Similarly, the emulsion flow rate in the first mixer is between 20 and 200 m3/h, according to the type of borehole (vertical, horizontal, multiple, etc).

In practice, the (co)polymer content in the commercially produced invert emulsion and before predilution is between 20 and 50% depending on the manufacturing conditions.

In practice, the method of the invention uses (co)polymers of acrylamide but also applies to any water soluble polymers, including polymers with variable anionicities or copolymers of acrylamide with other comonomers such as AMPS (Acrylamido Methyl Propane Sulphonic Acid).

In an advantageous embodiment, the standard product is a polyacrylamide emulsion containing 70% of acrylamide and 30% of acrylic acid.

The reverse emulsion according to the invention generally contains a inverting agent incorporated in a concentration such that the emulsion remains stable.

The invention also relates to an installation for implementing the abovementioned method. The said installation successively comprises, mounted on a bypass of the main injection water circuit, a first static mixer connected to a tank storing the emulsion to be diluted, and a second static mixer arranged directly on the main circuit.

In an advantageous embodiment, the mixers are static mixers like those sold by Sulzer under the trade names SMX and SMV and described accurately in document EP 1437173 incorporated by reference. Preferably, the static mixers contain at least 10 mixing elements.

It is acknowledged that the SMX and SMV type mixers from Sulzer Chemtech Ltd., Sulzer Allee 48, CH 8404 Winterthur, Switzerland for Europe and Kenics, Chemineer Inc, 125 Flagship Drive, North Andover, Mass. 01845 USA, are the most effective.

Comparative studies with propellers or hole mixers were carried out and published in several articles, in particular:
- "Don't be baffled by Static Mixers" Thomas Bayer, Klaus Himmler, Volker Hessel, Chemical Engineering, May 2003, p. 50-57,
- "Continuous mixing of fluids" Henzler, Ullmann, Vol 9 p 305-331.

Obviously, other mixers can be employed provided their dimensions are adjusted, which ultimately has an impact on the installation cost.

The invention and the advantages thereof will appear clearly from the following examples, in conjunction with the appended figures.

Figure 4A:
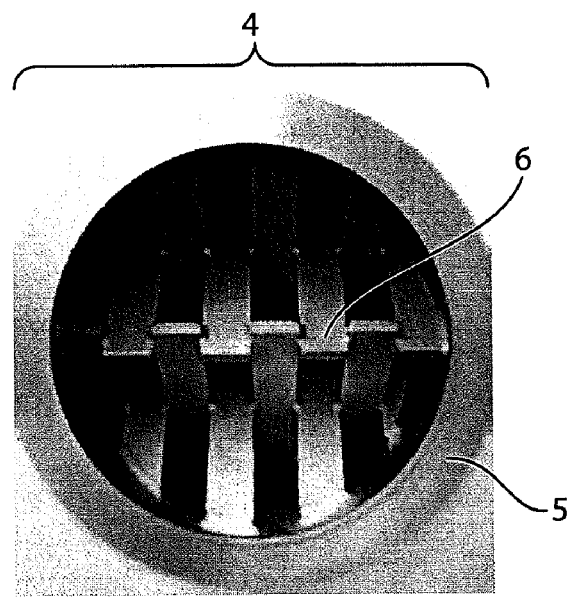

FIGS. 4a, b and c show components of the Sulzer SMX type static mixers.

1. PREPARATION OF THE EMULSION

To obtain a maximum viscosity in the conditions of use, the standard product is a polyacrylamide emulsion containing 70% of acrylamide and 30% of acrylic acid.

This standard emulsion is produced in a manner well known to a person skilled in the art with a number of possible alternatives.

The following are mixed in an aqueous phase in a dissolution tank:
4596 kg of 50% acrylamide obtained by biological method,
1108 kg of high purity glacial acrylic acid,
1104 kg of water
1086 kg of high purity 50% caustic soda
360 gr of sodium bromate
4680 gr of Versenex 80,
240 kg of sodium acetate,
4320 gr of sodium formiate
which is cooled to 20° C.
In a 10 000 liter reactor, the oil phase is prepared by mixing:
49 kg of Hypermer 2296 (CRODA)-3037 kg of Exsol D100
197 kg of sorbitan oleate
39 kg of Tween 81 (CRODA)
3600 gr of AZDN.

The aqueous phase is added slowly to the oil phase and the mixture is passed through a rotary emulsifier until it reaches a viscosity of 1000 cps while maintaining the mixture at 20° C.

The emulsion is then sparged with a flow rate of 200 m³/h of high purity nitrogen (<5 ppm $O_2$). 10 gr of TBHP (tert butyl hydroxy peroxide) are then added and the pumping of a dilute solution of sodium bisulphite is started. Polymerization begins and results in an increase in the temperature of the emulsion. When the temperature reaches 38° C., the addition of bisulphite is stopped.

The reaction continues at this temperature, activated by the AWN for 150 minutes. The reaction is then complete.

The emulsion is cooled to 20° C. and 4% of Plurafac LP 400 (BASF) added in 30 minutes.

Aging tests in the laboratory show that the emulsion is close to destabilisation, which can occur at about 4.5 to 5% of Plurafac.

This product is the standard industrial product that must be dissolved in line in less than 5 minutes with a final filterability (Filter Ratio) lower than 1.5 in a concentration of 500 to 2000 ppm, usually at a concentration close to 1000 ppm of active matter.

2. INSTALLATION

Figure 1:
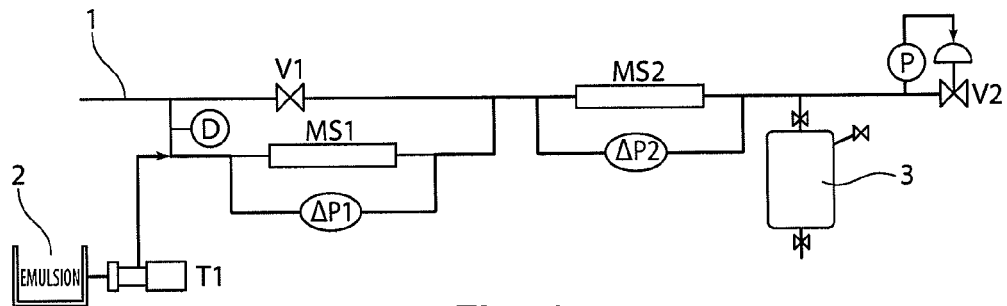
FIG. 1 is a diagram of the installation of the invention.

As shown in FIG. 1, the installation of the invention comprises the following elements:

The main line (1) is the high pressure water flooding line, injecting 200 m³/h at a pressure up to 120 bars.

This injection line is modified as follows:
1) A bypass is installed with a Sulzer SMX DN 65 (MS1) static mixer containing 15 mixing elements and a valve on the main line (V1) serves to pass a variable quantity of water into the mixer MS1 measured and regulated by D1.
2) A 130 bar triplex pump (T1) is used to inject variable quantities of emulsions (2) before this status mixed (MS1).
3) At the junction point of the main stream and the stream containing the polymer, a second static mixer is installed. This is a SMX DN 200 mixer (MS2) containing 15 mixing elements.
4) A standard API type sampler (3) serves to take samples without mechanical degradation. These samples are then stirred for 5 minutes on a magnetic stirrer and a filterability test is performed.
5) A control valve (V2) serves to maintain a discharge pressure of 100 bar in the 10 line. The residence time in the overall system varies between 2 and about 10 seconds.

Figure 2:
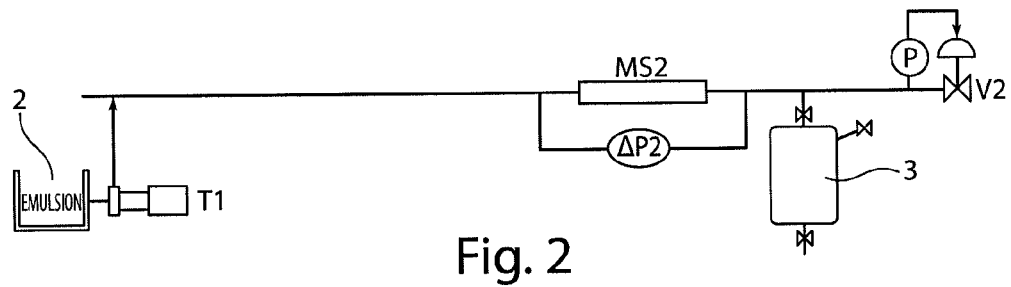
FIGS. 2 and 3 are diagrams of an installation not conforming complying with the invention.
Figure 3:
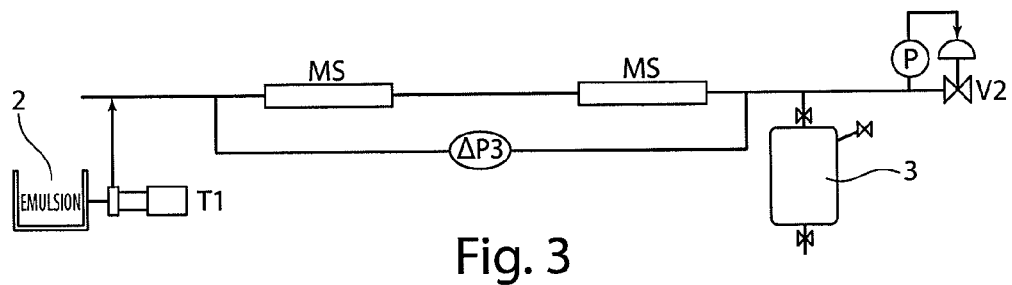

FIGS. 2 and 3 show installations which differ from the one in FIG. 1 in the location and number of static mixers.

The mixers SM1 and SM2 are of the SMX or SMV types from Sulzer Chemtech Ltd.

Figure 4B:
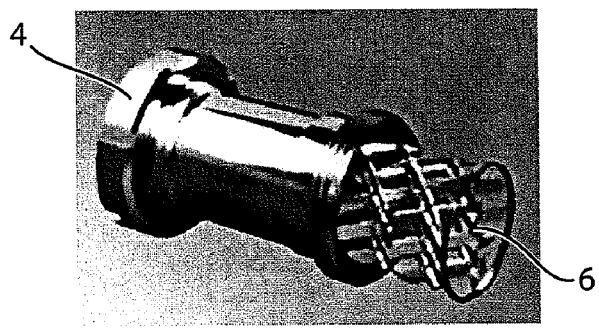
Figure 4C:
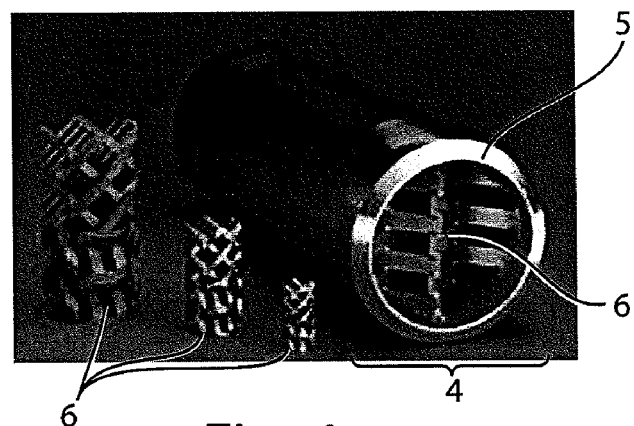

FIGS. 4*a*, 4*b* and 4*c* show a component mixing element of a Sulzer SMX type static mixer. Each mixing element (4) comprises an outer cylindrical body (5) containing the actual mixing elements (6) which are in the form of a specific lattice structure. The diameter of the mixing elements is variable. In the invention, the diameters of the mixing elements of the SM1 and SM2 mixers are different and calculated by the manufacturer in order to obtain the required pressure drops of the invention. This is the case of the mixers used in example 8. The pressure drop is the difference of pressure between the mixer outlet and inlet.

3. EXAMPLES

For all the examples, the test conditions selected are the average conditions encountered in enhanced oil recovery.

Brine composition NaCl—15.4 g/l
$CaCl_2.2H_2O$—2.54 g/l
$MgCl_2.6H_2O$—2.1 g/l
$NaHCO_3$—0.62 g/l

Example 1

The injection installation is described in FIG. 1.

It is required to reproduce the injection into an oil well of 200 m³ of brine containing 1000 ppm of polymer or 3300 ppm of emulsion (660 litres/hour). These volumes are much higher than the current volumes used for flocculation and there is practically no past experience in this field.

The following conditions are applied to the system:
MS1 Water flow rate 20 m³/h
  Emulsion flow rate 660 litres/h
  Pressure drop 2.8 bars
MS2 Total flow rate 200 m³/h
  Pressure drop 2.4 bars A sample is taken and stirred for 5 minutes on a magnetic stirrer, the Filter Ratio obtained is 1.3.

Example 2

The assembly No. 2 is used in the following conditions:
MS2 Total flow rate 200 m³/h
  Pressure drop in the mixer 2.3 bars The filtration test of the solution is difficult and the FR is higher than 5.

Example 3

The assembly No. 3 is employed, using two static mixers in line MS2+MS3 of the same type SMX DN 200.

The pressure drop measure is 4.9 bars. The sample taken and stirred for 5 minutes also shows a filterability above 5.

Example 4

Example No. 1 is reproduced by diluting the polymer in MS1 with half the quantity of water. The conditions are as follows:
MS1: Water flow rate: 10 m³/h
  Emulsion flow rate: 660 l/h
  Pressure drop: 1.2 bar.
MS2: Total flow rate: 200 m³/h
  Pressure drop: 2.4 bars The sample taken has a Filter Ratio of 2, indicating that the mixing in MS1 has become insufficient.

Example 5

Example No. 1 is reproduced but by increasing the quantity of water in MS1 to 40 m³/h in order to increase the pressure drop. The conditions are as follows:
MS1: Water flow rate: 40 m³/h
  Emulsion flow rate: 660 l/h
  Pressure drop: 9.9 bars.
MS2: Total flow rate: 200 m³/h
  Pressure drop: 2.4 bars The sample taken has a Filter Ratio of 1.1 indicating practically perfect dissolution.

Example 6

In this example, the flow rates are varied in MS1 while maintaining a total flow rate of 100 m³/h in MS2 and injecting 330 litres/hour of emulsion to maintain a polymer concentration of 1000 ppm.

This test is performed to obtain the minimum flow rate compatible with FIG. 1.

| Total flow rate m³/h | Flow rate MS1 m³/h | Pressure drop MS1 bar | Pressure drop MS2 bar | Filter Ratio |
|---|---|---|---|---|
| 100 | 20 | 2.8 | 1.2 | 1.6 |
| 100 | 40 | 10.0 | 1.2 | 1.3 |

A good filterability result can be obtained provided that a pressure drop above 2.8 bar is maintained in MS1.

Example 7

In this example, example No. 1 is reproduced but the number of elements is reduced to 10. The results are as follows:

| Total flow rate m³/h | Flow rate MS1 m³/h | Pressure drop MS1 bar | Pressure drop MS2 bar | Filter Ratio |
|---|---|---|---|---|
| 200 | 20 | 1.8 | 2.4 | 1.7 |
| 100 | 20 | 1.8 | 1.2 | >2 |

The fact of using the static mixer with less than 15 standard elements lowers the Filter Ratio below the desired 1.5.

Example 8

In this example, the maximum and minimum injection water flow rates used are 9 and 34 m³/h.
MS1 contains 15 elements diameter 25 mm type SMx25-15
MS2 contains 15 elements diameter 80 mm type SMx80-15
The emulsion flow rate is 0.19 m³/h. The results obtained are as follows:

| Total flow rate m³/h | Flow rate MS1 m³/h | Pressure drop MS1 bar | Pressure drop M52 bar | Filter Ratio |
|---|---|---|---|---|
| 34 | 6.3 | _10. | 3.1 | 1.1 |
| 34 | 4.7 | 5.9 | 3.0 | 1.2 |
| 9 | 6.3 | 10.2 | 0.7 | 1.9 |
| 17 | 6.3 | 10.9 | 1.2 | 1.4 |
| 17 | 4.7 | 5.9 | 1.2 | 1.5 |

It is found that the pressure drop in MS2 must be sufficient to maintain a good filterability with extrapolable results between the various dimensions of dissolution apparatus.

The in line dissolution of very large quantities (up to several m³/h) of polyacrylamide emulsions to a final concentration of 1000 to 2000 ppm is not feasible by a single direct mixing by static mixer.

This is because the level of filterability of the solution obtained is insufficient for risk-free injection, based on the standards applied for injection of fluids, in the case of enhanced oil recovery (EOR).

The invention claimed is:

1. Enhanced oil recovery method consisting of injecting water through a main circuit and continuously dissolving, in the injection water, a stable invert emulsion of acrylamide (co)polymer containing at least one inverting agent, whereby:
   in a first step, the emulsion is prediluted in a first static mixer mounted on a bypass of the main injection water circuit, to a (co)polymer concentration of at least 5 g/l, the difference of pressure between the mixer outlet and inlet being at least 2 bars
   in a second step, the prediluted emulsion from the first mixer is diluted in a second static mixer mounted on the main injection water circuit, to a concentration corresponding to the injection concentration of the water in the well of between 500 and 3000 ppm, the difference of pressure between the mixer outlet and inlet being at least 1 bar.

2. Method according to claim 1, characterized in that the (co)polymer concentration in the first step is between 5 and 20 g/l.

3. Method according to claim 1, characterized in that the difference of pressure between the outlet and inlet of the first mixer is between 2 and 10 bars.

4. Method according to claim 1, characterized in that the difference of pressure between the outlet and inlet of the second mixer is between 1 and 3 bars.

5. Method according to claim 1, characterized in that the injection water flow rate in the main circuit is between 100 and 200 m³/h at a pressure of between 40 and 200 bars governed by the field pressure.

6. Method according to claim 1, characterized in that the (co)polymer content in the invert emulsion before predilution is between 20 and 50%.

7. Method according to claim 2, characterized in that the (co)polymer concentration in the first step is about 20 g/l.

8. Method according to claim 3, characterized in that the difference of pressure between the outlet and inlet of the first mixer is 10 bars.

9. Method according to claim 4, characterized in that the difference of pressure between the outlet and inlet of the second mixer is 3 bars.

* * * * *